(12) United States Patent
Lee et al.

(10) Patent No.: US 10,516,297 B2
(45) Date of Patent: Dec. 24, 2019

(54) WIRELESS POWER TRANSFER PAD AND GROUND ASSEMBLY HAVING THE SAME

(71) Applicants: Hyundai Motor Company, Seoul (KR); Kia Motors Corporation, Seoul (KR); Research & Business Foundation Sungkyunkwan University, Suwon, Gyeonggi-do (KR)

(72) Inventors: Woo Young Lee, Gyeonggi-do (KR); Gyu Yeong Choe, Gyeonggi-Do (KR); Byoung Kuk Lee, Gyeonggi-Do (KR); Min Kook Kim, Gyeonggi-Do (KR); Dong Myoung Joo, Gyeonggi-Do (KR); Jong Eun Byeon, Gyeonggi-Do (KR); Min Hyuck Kang, Gyeonggi-Do (KR); Dong Gyun Woo, Gyeonggi-Do (KR); Min Jung Kim, Gyeonggi-Do (KR)

(73) Assignees: Hyundai Motor Company, Seoul (KR); Kia Motors Corporation, Seoul (KR); Research & Business Foundation Sungkyunkwan University, Suwon, Gyeonggi-do (KR)

( * ) Notice: Subject to any disclaimer, the term of this patent is extended or adjusted under 35 U.S.C. 154(b) by 361 days.

(21) Appl. No.: 15/452,350

(22) Filed: Mar. 7, 2017

(65) Prior Publication Data
US 2017/0264143 A1 Sep. 14, 2017

(51) Int. Cl.
*H02J 50/12* (2016.01)
*H02J 50/80* (2016.01)
*H02J 50/90* (2016.01)

(52) U.S. Cl.
CPC .............. *H02J 50/12* (2016.02); *H02J 50/80* (2016.02); *H02J 50/90* (2016.02)

(58) Field of Classification Search
CPC . H02J 50/12; H02J 50/80; H02J 50/90; B60L 53/12; H01F 27/255; H01F 27/2823; H01F 38/14
See application file for complete search history.

(56) References Cited

U.S. PATENT DOCUMENTS 9,035,605 B2 * 5/2015 Tabata .................... H01F 38/14
320/108
2014/0125140 A1 * 5/2014 Widmer .................. H02J 7/025
307/104

(Continued)

FOREIGN PATENT DOCUMENTS

KR 10-2014-037968 A 3/2014
KR 10-2015-054641 A 5/2015
KR 10-2015-082419 A 7/2015

*Primary Examiner* — Jared Fureman
*Assistant Examiner* — Michael J Warmflash
(74) *Attorney, Agent, or Firm* — Mintz Levin Cohn Ferris Glovsky and Popeo, P.C.; Peter F. Corless

(57) ABSTRACT

A wireless power transmission pad for transmitting wireless power to a reception pad including a secondary coil includes: a rectangular-shaped primary coil having an X-width defined in an x-direction and a Y-width defined in a y-direction and having a central space; a ferrite coupled to the primary coil; and a housing supporting the primary coil and the ferrite. A first cross-sectional area of a first portion including the X-width of the primary coil is smaller than a second cross-sectional area of a second portion including the Y-width of the primary coil.

15 Claims, 12 Drawing Sheets

(56) References Cited

U.S. PATENT DOCUMENTS

| | | | |
|---|---|---|---|
| 2015/0130291 A1* | 5/2015 | Lim | H01Q 1/2225 307/104 |
| 2016/0094045 A1* | 3/2016 | Bae | H02J 7/0042 307/104 |
| 2018/0109292 A1* | 4/2018 | Lee | H02J 50/10 |

* cited by examiner (a)

(b)

WIRELESS POWER TRANSFER PAD AND GROUND ASSEMBLY HAVING THE SAME

CROSS-REFERENCE TO RELATED APPLICATION

This application claims the benefit of priority to Korean Patent Application No. 2016-0029552 filed on Mar. 11, 2016 in the Korean Intellectual Property Office (KIPO), the entire contents of which are hereby incorporated by reference as if fully set forth herein.

TECHNICAL FIELD

The present disclosure relates generally to a wireless power transfer pad, and more particularly, to a wireless power transfer pad used for electric vehicle (EV) wireless power transfer, and a ground assembly having the same.

BACKGROUND

The standard J2954 of the society of automobile engineers (SAE) specifies performances required for power levels, interoperability, vertical and horizontal separation distances for rated output, communication methods between the transmission/reception pads, operating frequency, requirements for electromagnetic interference (EMI) and electromagnetic compatibility (EMC), and stability for wireless power transfer systems using magnetic induction for charging batteries of electric vehicles (EVs).

In addition to the above-described items, SAE J2954 also specifies transmission and reception pads according to power capacities. Thus, most automobile manufacturers adhere to the structures and sizes of transmission and reception pads specified in the specification.

Since the numerical values given in the specification are not absolute values except for the external size of the corresponding pads, it is necessary to consider the optimal configuration of the transmission/reception pads in order to maximize their performance. Thus, there is a need for an optimal configuration of the wireless power transfer pads.

SUMMARY

Accordingly, embodiments of the present disclosure are provided to substantially obviate one or more problems due to limitations and disadvantages of the related art. Embodiments of the present disclosure provide a wireless power transfer pad maximizing performance of the wireless power transfer. Embodiments of the present disclosure also provide a ground assembly having the above-described wireless power transfer pad.

According to embodiments of the present disclosure, a wireless power transmission pad for transmitting wireless power to a reception pad including a secondary coil includes: a rectangular-shaped primary coil having an X-width defined in an x-direction and a Y-width defined in a y-direction and having a central space; a ferrite coupled to the primary coil; and a housing supporting the primary coil and the ferrite. A first cross-sectional area of a first portion including the X-width of the primary coil is smaller than a second cross-sectional area of a second portion including the Y-width of the primary coil.

A ratio of the first cross-sectional area to the second cross-sectional area may be 9:13.

The X-width of the primary coil may be greater than 80 mm and less than 100 mm, and the Y-width of the primary coil may be greater than 120 mm and less than 140 mm.

The X-width of the primary coil may be 90 mm, and the Y-width of the primary coil may be 130 mm.

A first ratio of the X-width of the primary coil to an X-length of the ferrite defined in the x-direction and a second ratio of the Y-width of the primary coil to a Y-length of the ferrite defined in the y-direction may have a difference of less than 0.02 within a range from 0.14 to 0.28.

An X-width of the secondary coil defined in the x-direction may be greater than 35 mm and less than 37 mm, and a Y-width of the secondary coil defined in the y-direction may be greater than 35 mm and less than 37 mm.

The Y-width of the primary coil may include a first Y-width and a second Y-width disposed in the y-direction with the central space interposed therebetween, and respective sizes of the first Y-width and the second Y-width may be different from each other.

A size of one of the first Y-width and the second Y-width may be equal to a size of the X-width of the primary coil.

Furthermore, in accordance with embodiments of the present disclosure, a wireless power transmission pad for transmitting wireless power to a reception pad including a secondary coil includes: a rectangular-shaped primary coil having an X-width defined in an x-direction and a Y-width defined in a y-direction and having a central space; a ferrite coupled to the primary coil; and a housing supporting the primary coil and the ferrite. A first area of insulating material in a first cross-sectional area of a first portion including the X-width of the primary coil is smaller than a second area of insulating material in a second cross-sectional area of a second portion including the Y-width of the primary coil.

An average spacing between two adjacent windings arranged in the x-direction in a cross-section of the first portion may be smaller than an average spacing between two adjacent windings arranged in the y-direction in a cross-section of the second portion.

A ratio of the first cross-sectional area to the second cross-sectional area may be 9:13.

The ferrite may have a structure that surrounds the primary coil and protrudes into the central space of the primary coil.

The wireless power transmission pad may further comprise a metallic shield, and a layered structure may include a first insulating member, the ferrite, a second insulating member, and the primary coil is disposed on the metallic shield.

An outer thickness or a vertical distance from a lower portion of the first insulating member located below the metallic shield to an upper portion of the primary coil in the layered structure may be less than 40 mm.

Also, windings in the second portion may have a multi-layer structure.

Also, windings in the multi-layer structure may be arranged at regular intervals in the y-direction.

Also, windings adjacent to each other in a first layer and windings adjacent to each other in a second layer of the multi-layer structure may be arranged at different average intervals.

Also, windings in the multi-layer structure may be arranged so that intervals between two adjacent windings in the y-direction sequentially decrease or increase.

Furthermore, in accordance with embodiments of the present disclosure, a ground assembly in a wireless power transfer system includes: a power conversion unit that converts power from a grid or a power source; and a wireless power transmission pad coupled to the power conversion unit. The wireless power transmission pad includes a rectangular-shaped primary coil having an X-width defined in an x-direction and a Y-width defined in a y-direction and having a central space, and includes a ferrite coupled to the primary coil, and a first cross-sectional area of a first portion including the X-width of the primary coil is smaller than a second cross-sectional area of a second portion including the Y-width of the primary coil.

A first area of insulating material in the first cross-sectional area may be smaller than a second area of insulating material in the second cross-sectional area.

Using the above-described wireless power transfer pad and the ground assembly having the same according to embodiments of the present disclosure, the wireless power transfer performance between transmission and reception coils in the wireless power transfer system can be maximized. Further, a transmission pad having a thin outer shape and excellent coupling performance is provided, thereby improving the wireless power transfer efficiency in the wireless power transfer system.

BRIEF DESCRIPTION OF DRAWINGS

Embodiments of the present disclosure will become more apparent by describing in detail embodiments of the present disclosure with reference to the accompanying drawings, in which.

Figure 1:
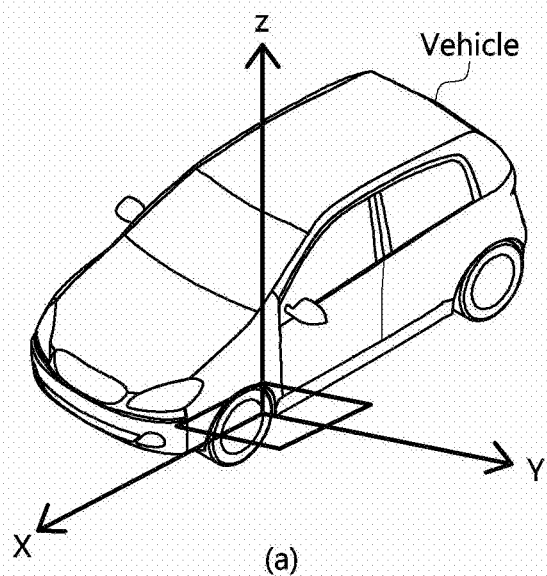
FIG. 1 is a conceptual diagram illustrating x-axis and y-axis defined in the SAE J2954 which can be employed in embodiments of the present disclosure.
Figure 1:
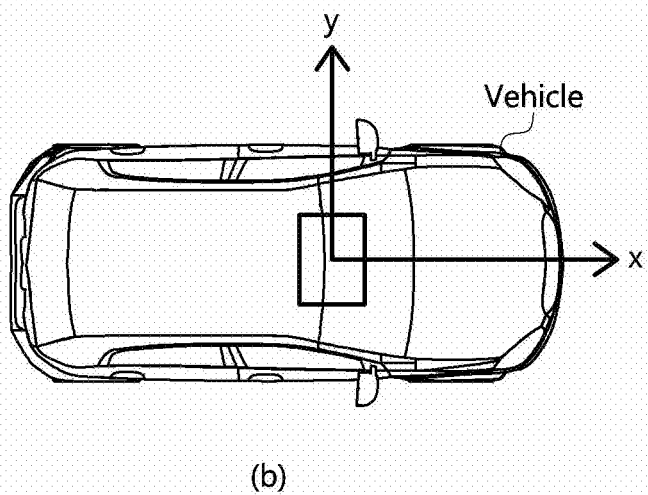

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment

DETAILED DESCRIPTION OF THE EMBODIMENTS

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present disclosure are defined as follows.

"Electric Vehicle, EV": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle, PEV": An Electric Vehicle that recharges the on-vehicle primary battery by connecting to the power grid.

"Plug-in vehicle, PV": An electric vehicle rechargeable through wireless charging from an electric vehicle supply equipment (EVSE) without using a physical plug or a physical socket.

"Heavy duty vehicle; H.D. Vehicle": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system, WCS": The system for wireless power transfer and control between the GA and VA including alignment and communications. This system transfers energy from the electric supply network to the electric vehicle electromagnetically through a two-part loosely coupled transformer.

"Wireless power transfer, WPT": The transfer of electrical power from the AC supply network to the electric vehicle by contactless means.

"Utility": A set of systems which supply electrical energy and include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which component of a system interwork with corresponding components of the system in order to perform operations aimed by the system. Also, information interoperability may mean capability that two or more networks, systems, devices, applications, or components can efficiently share and easily use information without giving inconvenience to users.

"Inductive charging system": A system transferring energy from a power source to an EV through a two-part gapped core transformer in which the two halves of the transformer, primary and secondary coils are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly, GA": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly, VA": An assembly on the vehicle consisting of the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA Coil magnetic surface distance": the distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g. an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

"Command and control communication": The communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning ad pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID basically distinguishes multiple wireless LANs. Therefore, all access points (Aps) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which you want to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller managing the at least one GA. The GA may comprise at least one wireless communication device. The charging station may mean a place having at least one GA, which is installed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

In embodiments according to the present disclosure, the light load driving or light load operation may include, for example, charging the high voltage battery with a charging voltage lower than a predetermined rated voltage in the latter half of charging for the high voltage battery connected to the VA in the WPT system. Also, the light load operation may include a case in which the high-voltage battery of EV is charged at a relatively low voltage and at a low speed by using a low-speed charger such as a household charger.

Hereinafter, embodiments according to the present disclosure will be explained in detail by referring to accompanying figures.

FIG. 1 is a conceptual diagram illustrating x-axis and y-axis defined in the SAE J2954 which can be employed in embodiments of the present disclosure.

As illustrated in FIG. 1, in the wireless power transfer system for EVs, a right-handed coordinate system may be used to define the structure and position of the transmission pad and the reception pad.

In the right-handed coordinate system, the front direction or the back-and-forth direction of the vehicle is defined as x-axis, the driver direction of a left steering vehicle or the left and right directions of the left steering vehicle is defined as y-axis, and the upward or downward direction of the vehicle is defined as z-axis. Also, the magnetic center of the GA coil may be defined as $x=0$ and $y=0$, and the ground surface may be defined as $z=0$.

Figure 2:
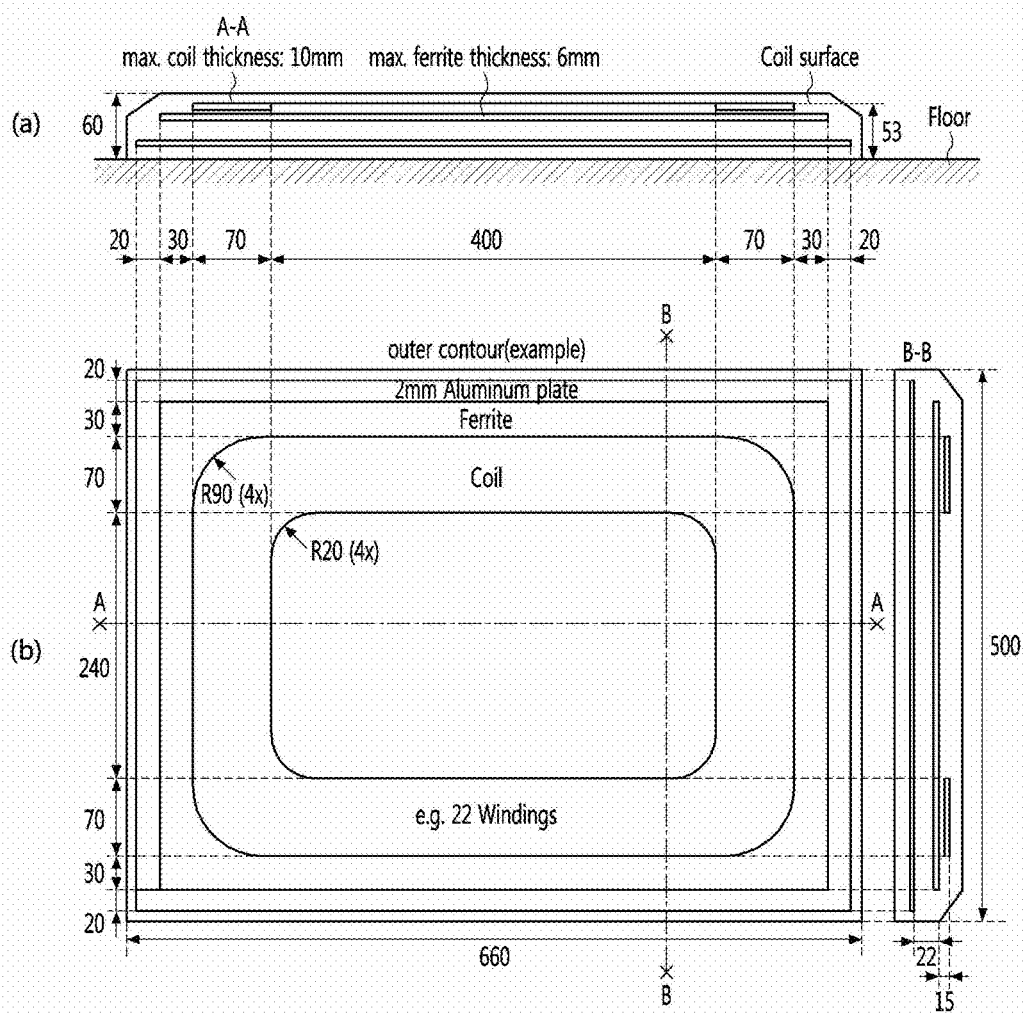
FIG. 2 is a configuration diagram illustrating an example of a transmission pad according to the SAE J2954 standard.

FIG. 2 is a configuration diagram illustrating an example of a transmission pad according to the SAE J2954 standard.

As shown in the cross-sectional view (a) and the plan view (b) of FIG. 2, the transmission pad is composed of a GA coil, a ferrite, an aluminum plate, and a housing covering them. The B-B cross-sectional structure is substantially the same as the cross-sectional structure shown in the A-A cross-sectional view except that the length of the central space (i.e., core area) of the GA coil in the x-direction is 240 mm.

The GA coil has a rectangular structure, and four corners of the rectangular structure have a shape bent with a predetermined radius. The coil width of the GA coil is substantially the same in the x-direction and the y-direction. That is, the coil width is 70 mm both in the x-direction or the y-direction. In this example, the GA coil is illustrated as a coil having 22 windings in a rectangular shape.

The thickness of the ferrite is 6 mm, and the thickness of the aluminum plate is 2 mm. The external thickness of the transmission pad is 60 mm, and the vertical height from the ground to the top of the GA coil is 53 mm (see SAE J2954). This vertical height may correspond to a vertical height from the bottom of the housing to the top of the ferrite in the case of other structures.

Figure 3:
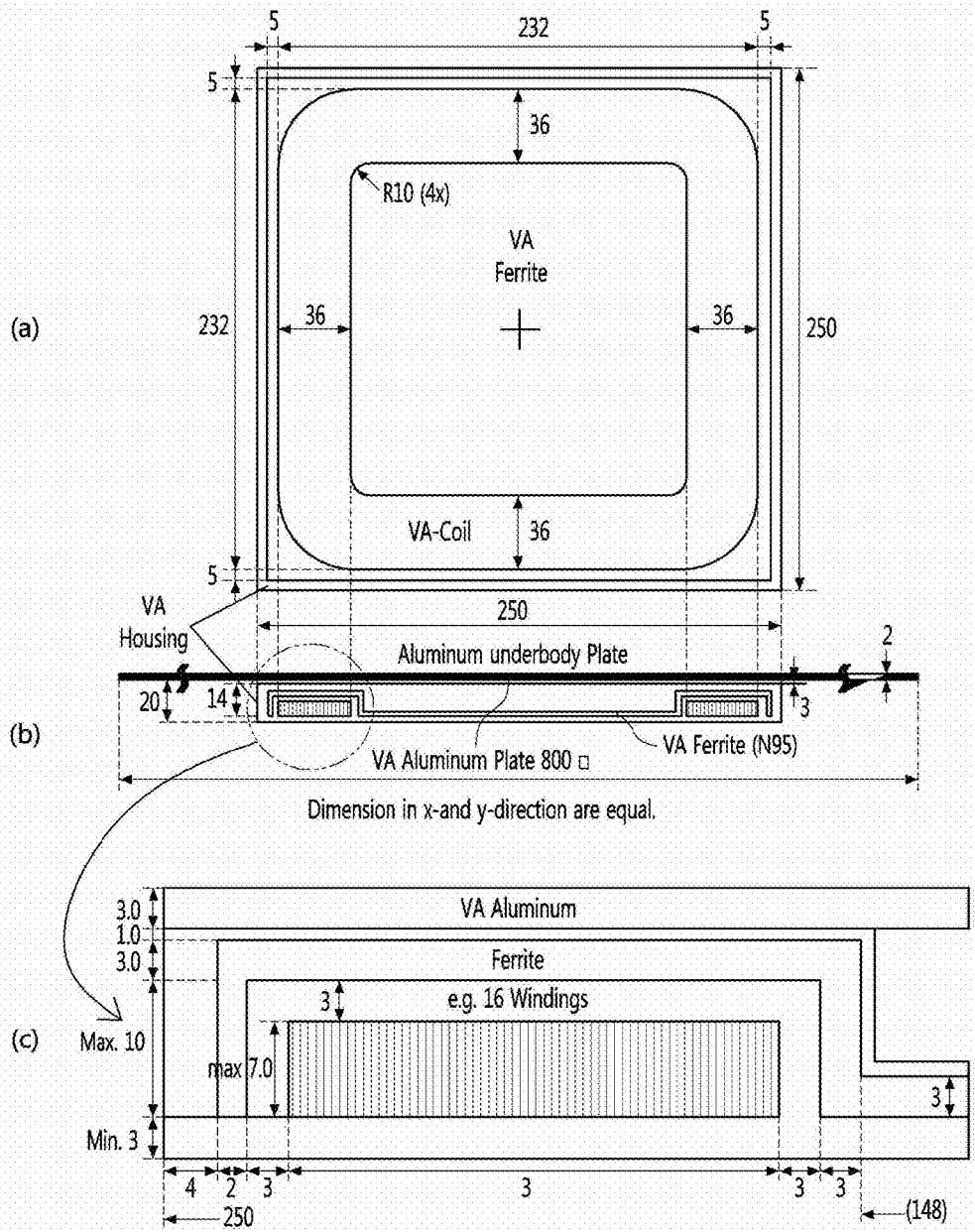
FIG. 3 is a configuration diagram illustrating an example of a reception pad according to the SAE J2954 standard.

FIG. 3 is a configuration diagram illustrating an example of a reception pad according to the SAE J2954 standard.

As shown in the plan view (a), central section (b), and partial enlargement (c) of the central sectional view of FIG. 3, the reception pad comprises a VA aluminum, a VA ferrite, a VA coil, and an insulating VA housing.

The VA coil has a square structure, and four corners of the square structure have a shape bent with a predetermined radius. The maximum thickness of the VA coil is 7.0 mm, and the coil width is the same both in the x-direction and the y-direction. The coil width is 36 mm in the x-direction and y-direction, respectively. In this example, the GA coil is illustrated as a coil having 16 windings in a rectangular shape.

The thickness of the VA ferrite is 6 mm. The VA ferrite may have a U-shaped structure with a protruding center inserted into the center space (i.e., core area) of the VA coil.

The insulating AV housing is placed between the VA ferrite and the VA aluminum, surrounding the VA coil and covering the VA ferrite. The VA aluminum is disposed in contact with the aluminum underbody plate.

The size of the reception pad is 250 mm×250 mm, and the thickness of the reception pad is 20 mm except for the aluminum underbody plate. The dimensions and spacing of the transmission pad and the reception pad in the above-described example are summarized in Table 1 below.

TABLE 1

|  | Transmission pad | Reception pad |
| --- | --- | --- |
| External size | 660 * 500 mm$^2$ | 250 * 250 mm$^2$ |
| Aluminum shield | 640 * 480 * 2 mm$^3$ | 250 * 250 * 3 mm$^3$ |
| Aluminum underbody plate | Not applicable | 800 * 800 *2 mm$^2$ |
| Ferrite | 600 * 440 * 6 mm$^3$ | 224 * 224 * 3 mm$^3$ |
| Ferrite shape | Flat plate type | U-shaped structure with a protruding center |
| Coil outer diameter | 540 * 380 mm$^2$ | 232 * 232 mm$^2$ |
| Coil inner diameter | 400 * 240 mm$^2$ | 160 * 160 mm$^2$ |
| Coil thickness | 10 mm (max.) | 7 mm (max.) |
| Coil width/Ferrite | 0.167/0.117 | 0.149/0.149 |
| Ground-Aluminum | 14 mm | — |
| Aluminum top - Ferrite top | 22 mm | — |
| Ferrite top - coil top | 15 mm | — |
| Aluminum top - Ferrite bottom | 16 mm (min.) | 1 mm |

Figure 4:
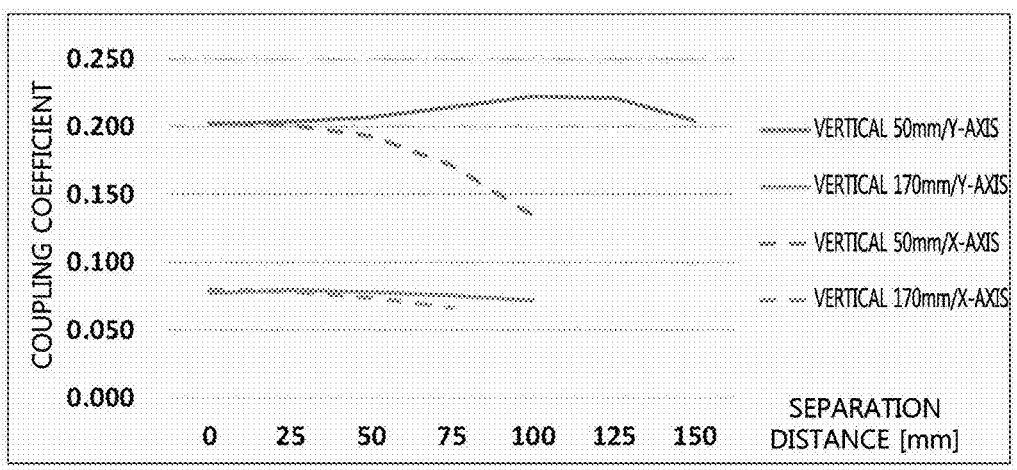
FIG. 4 is a graph illustrating coupling coefficients between the transmission/reception pads according to a comparative example.

FIG. 4 is a graph illustrating coupling coefficients between the transmission/reception pads according to a comparative example.

As shown in FIG. 4, in the wireless power transfer of the comparative example, the coupling performance between the SAE J2954 transmission and reception pads is shown, when a horizontal separation of the reception pad exists under a condition that a vertical separation distance between the transmission and reception coils is 50 or 170 mm defined in the Z-class 1 or 2 (Z1 and Z2).

According to the condition presented in the comparative example, the performances under a condition that the vertical separation distance is 50 mm were respectively evaluated to the maximum x-axis separation of 100 mm and the maximum y-axis separation 150 mm. Also, the performances under a condition that the vertical separation distance is 170 mm were respectively evaluated to the maximum x-axis separation of 75 mm and the maximum y-axis separation of 100 mm. Here, all of the reception pad parameters proposed in the SAE J2954 were applied except that the ferrite shape is changed to the plate type. The meaning of each axis (x axis, y axis and z axis) is same as described in FIG. 1.

Table 2 below shows values of coupling coefficients at respective points illustrated in FIG. 4.

TABLE 2

|  | 0 | 25 | 50 | 75 | 100 | 125 | 150 |
| --- | --- | --- | --- | --- | --- | --- | --- |
| Vertical 50 mm/ y-axis separation | 0.202 | 0.204 | 0.207 | 0.214 | 0.222 | 0.221 | 0.204 |
| Vertical 170 mm/ y-axis separation | 0.077 | 0.079 | 0.078 | 0.076 | 0.072 | — | — |
| Vertical 50 mm/ x-axis separation | 0.202 | 0.201 | 0.193 | 0.171 | 0.134 | — | — |
| Vertical 170 mm/ x-axis separation | 0.080 | 0.078 | 0.074 | 0.067 | — | — | — |

As experimented in the comparative example, the maximum coupling coefficient between the GA/VA coils is 0.222 at the vertical separation of 50 mm, and tends to decrease remarkably according to the increasing x-axis separation.

Also, the maximum coupling coefficient between the GA/VA coils is 0.080 at the vertical spacing of 170 mm, and tends not to vary greatly within the range of the x-axis/y-axis separation distance of 75 and 100 mm.

Figure 5:
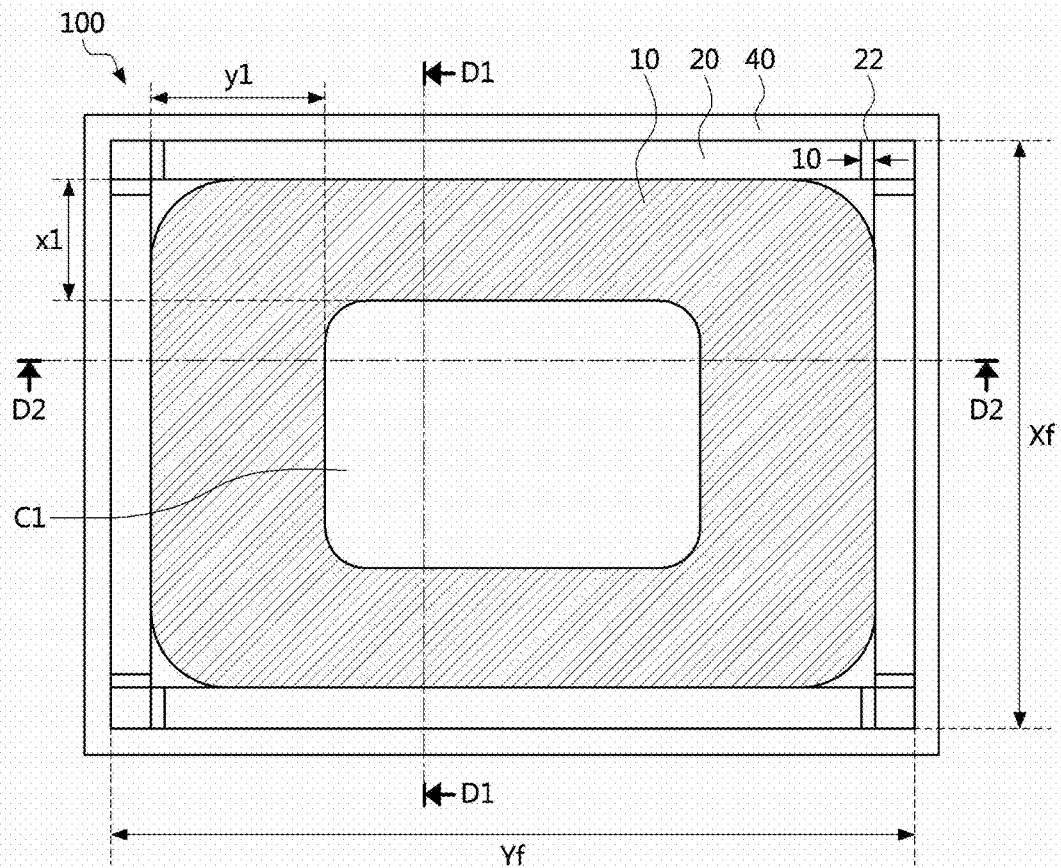
FIG. 5 is a plan view illustrating a wireless power transmission pad according to embodiments of the present disclosure.

FIG. 5 is a plan view illustrating a wireless power transmission pad according to embodiments of the present disclosure.

As shown in FIG. 5, a wireless power transmission pad (hereinafter, simply referred to as a "transmission pad") 100 according to embodiments of the present disclosure may comprise a primary coil 10, a ferrite 20, and a housing. The transmission pad 100 may further include a metallic shield (e.g., see 30 in FIG. 6). The housing may be referred to as an insulating member 40, a first insulating material, or a second insulating material as an insulating member.

When the transmission pad 100 is placed on a floor parallel to the x-y plane defined by the x- and y-directions, the primary coil 10 may have a rectangular shape with a X-width x1 defined in the x-direction and a Y-width y1 defined in the y-direction. Also, the primary coil 10 may have a central space C1 located inside the rectangular shape.

The X-width x1 may be a width for a first portion of the primary coil 10 overlapping with a straight line extending in the x-direction, and the Y-width y1 may be a width for a second portion of the primary coil 10 overlapping with a straight line extending in the y-direction.

In embodiments according to the present disclosure, the X-width x1 is smaller than the Y-width y1. The X-width x1 may be less than about 0.7 times the Y-width y1. If the thickness of the first portion and the thickness of the second portion are the same in the z-direction perpendicular to the x-y plane, a first cross-sectional area of the first portion having the X-width x1 is smaller than a second cross-sectional area of the second portion having the Y-width y1.

In another aspect, since there is a cross section of the primary coil made up of substantially the same number of windings in the first cross-sectional area and the second cross-sectional area, an area (i.e., a first area) of insulating material between the windings of the coil in the first cross-sectional area is smaller than an area (a second area) of the insulating material between the windings of the coil in the second cross-sectional area.

The X-width x1 may be greater than 80 mm and smaller than 100 mm in consideration of an error range, and the Y-width y1 may be larger than 120 mm and smaller than 140 mm in consideration of an error range. Preferably, the X-width x1 is 90 mm and the Y-width y1 is 130 mm Therefore, a ratio (x1:y1) may be larger than 0.5715 (4:7) and smaller than 0.8333 (5:6). Preferably, the ratio (x1:y1) may be about 0.6923 (9:13).

The reception pad corresponding to the above-described transmission pad may have the structure and dimensions shown in FIG. 3. That is, in the reception pad of the wireless power transfer system using the transmission pad according to embodiments of the present disclosure, a X-width (referred to as "X2-width") of the secondary coil defined in the x-direction may be larger than 35 mm and smaller than 37 mm, and a Y-width (referred to hereinbelow as "Y2-width") of the secondary coil may be greater than 35 mm and less than 37 mm.

The ferrite 20 may be disposed adjacent to the primary coil 10, magnetized by the magnetism induced from the primary coil 10, and paired with the ferrite of the reception pad to realize a high permeability. Since the ferrite 20 is close to an insulator, the heat generation is small.

In embodiments of the present disclosure, the ferrite 20 or a structure of the ferrite may be manufactured in the form of a flat plate using MnZn ferrite (e.g., PL-13). Also, the ferrite 20 may be manufactured using ferrites of different series within a range in which the initial permeability is high and a saturation magnetic flux density is satisfied. When the flat plate type ferrite 20 is used, magnetic flux components leaking into a bar type ferrite are not generated when the bar type ferrite is used, which is advantageous in that the loss can be prevented as compared with the bar type ferrite.

The ferrite 20 may have a rectangular shape having a vertical length Xf and a horizontal length Yf in the x-y plane perpendicular to the z-axis. The ferrite 20 may have a size protruding by a predetermined length outside the outline edge of the primary coil 10 when superimposed on the primary coil 10 in the x-y plane.

Also, the ferrite 20 may have a coupling structure 22 for reinforcing the coupling with the insulating member 40 in the structure in which the ferrite 20 is laminated with the primary coil 10 and the insulating member 40. The coupling structure 22 may include a concave-convex structure disposed at the boundary between the ferrite 20 and the insulating member 40. The concavo-convex structure may include a concave portion, a convex portion, or a combination thereof.

In embodiments of the present disclosure, the coupling structure 22 may have a shape of '#' in which two concave-convex portions cross each other at each bottom portion of the four corners of the ferrite 20 when viewed as placed in the x-y plane. The concave-convex portion may have a cross-sectional structure of a groove, a projection, or a combination thereof. In this case, the laminated coupling structure of the ferrite 20 and the insulating member 40 may be made solid in all of the x-, y-, and z-axis directions.

The insulating member 40 may be made of a material that supports and electrically insulates the primary coil 10, the ferrite 20, and the metallic shield. The insulating member 40 may include a first insulating member and a second insulating member that are stacked on each other. The insulating member 40 may be formed by molding the epoxy material at least once.

In embodiments of the present disclosure, the ferrite 20 may be disposed on the first insulating member, and the second insulating member may be laminated on the ferrite 20. The primary coil may be embedded in the second insulating member.

Meanwhile, in the above-described embodiment, although the two X-widths of both sides of the central space C1 in the vertical direction (i.e., x-direction) and the two Y-widths of both sides of the central space C1 in the horizontal direction (i.e., y-direction) are described as being equal to each other, without being restricted to such the configuration, the two X-widths may have different values, the two Y-widths may have different values, or one of the two Y-widths may have the same size as the X-width according to other embodiments. Such the modified form is a form in which the coil width structure shown in the present embodiment is partially adopted. Although the performance may be slightly lower than that of the optimum embodiment, it may be still possible to have a high coupling performance as compared with the conventional technique or the comparative example, and may be included in the scope of the present disclosure. Since the structure of such the transmission pad can be predicted from the present embodiment, detailed description thereof will be omitted.

Figure 6:
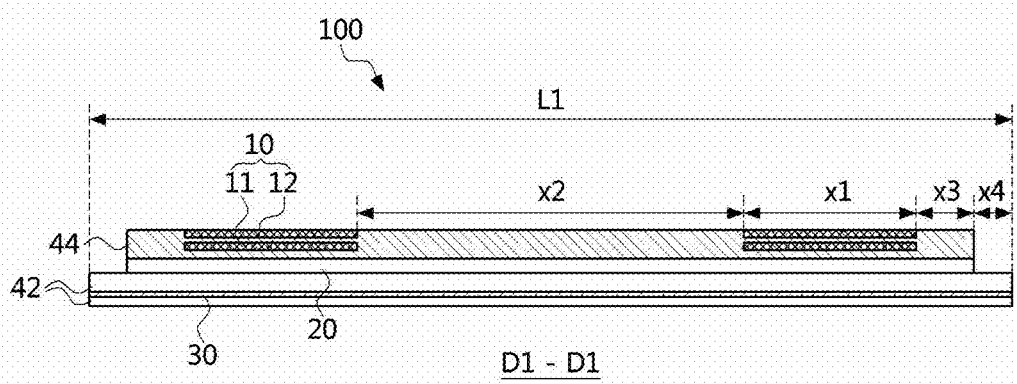
FIG. 6 is a left side view of the transmission pad of FIG. 5.

FIG. 6 is a left side view of the transmission pad of FIG. 5.

As shown in FIG. 6, the transmission pad 100 according to embodiments of the present disclosure may comprise a metallic shield 30 disposed in a first insulation material 42, the ferrite 20 stacked on the first insulation material 42, a second insulating material 44 laminated on the ferrite 20, and the primary coil 10 accommodated in the second insulating material 44.

The primary coil 10 may include a first coil layer 11 and a second coil layer 12 stacked on the first coil layer 11. When the first coil layer 11 is arranged as being in contact with a first plane parallel to the x-y plane, the second coil layer 12 may be arranged as being in contact with a second plane which is moved from the first plane in parallel to the z-axis direction by several millimeters. In embodiments of the present disclosure, a material of the first insulating member 42 having a thickness of several millimeters may be placed between the first coil layer 11 and the second coil layer 12.

The primary coil 10 may have two X-widths x1 with respect to the longitudinal length L1 defined in the x-direction of the transmission pad 100. In embodiments of the present disclosure, the lengths of the two X-widths x1 arranged on both sides of the central space portion of the predetermined length x2 are equal to each other. Depending on the implementation, the two X-widths may have different lengths, but at least one of the two X-widths must have the coil width x1 suggested herein for improved wireless power transfer performance. The coil width x1 corresponding to the X-width may be greater than 80 mm, less than 100 mm, and preferably 90 mm.

The ferrite 20 may have a size slightly larger than the rectangular primary coil 10. Assuming that the transmission pad 100 is placed on the x-y plane and can be viewed through the second insulating member 44, the ferrite 20 may have a portion exposed by a predetermined width x3 outside the outline of the primary coil 10 in both directions of the x-axis. The width x3 may be 30 mm, but is not limited thereto.

The metallic shield 30 may be made of aluminum. In embodiments of the present disclosure, the aluminum structure for the metallic shield 30 may be pure aluminum having a purity of 99% or more, but it is not limited thereto, and aluminum having other compositions may be applied as long as there is little difference in electrical characteristics.

The metallic shield 30 or the corresponding aluminum may have a size slightly larger than the rectangular ferrite 20. Assuming that the transmission pad 100 is placed on the x-y plane and can be viewed through the first insulating member 42, the metallic shield 40 may have a portion exposed by a predetermined width x4 outside the outline of the ferrite 20 in both directions of the x-axis. The width x4 may be 20 mm, but is not limited thereto.

The first insulating member 42 may have a size slightly larger than the second insulating member 42 having a rectangular shape. Assuming that the transmission pad 100 is placed on the x-y plane, the first insulation member 42 may have a portion exposed by a predetermined width x4 outside the outline of the second insulation member 44 in both directions of the x-axis. According to this structure, in the laminated structure of the first insulating member 42 and the second insulating member 44, a stepped portion where the vertical length of the rectangular insulating member become different in the z-axis direction may exist.

Figure 7:
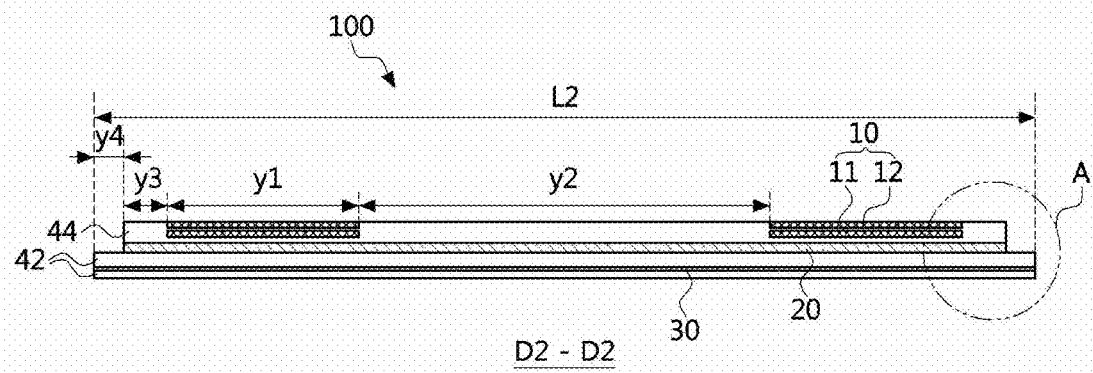
FIG. 7 is a front view of the transmission pad of FIG. 5.
Figure 8:
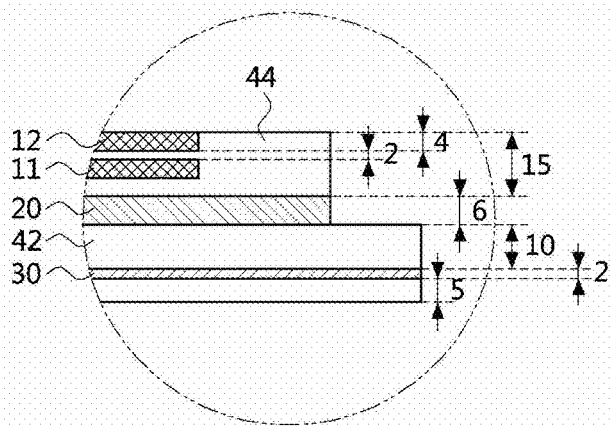
FIG. 8 is an enlarged front view of a part of the transmitting pad of FIG. 7.

FIG. 7 is a front view of the transmission pad of FIG. 5, and FIG. 8 is an enlarged front view of a part of the transmitting pad of FIG. 7.

As shown in FIG. 7, the primary coil 10 may have two Y-widths y1 with respect to the horizontal length L2 defined in the y-direction of the transmission pad 100. In embodiments of the present disclosure, the lengths of the two Y-widths y1 arranged on both sides of the central space portion of the predetermined horizontal length y2 are equal to each other. Depending on the implementation, the two Y-widths may have different lengths, but at least one of the two Y-widths must have the coil width y1 suggested herein for improved wireless power transfer performance. The coil width y1 corresponding to the Y-width may be greater than 120 mm, less than 140 mm, and preferably 130 mm.

The ferrite 20 may have a size slightly larger than the rectangular primary coil 10. Assuming that the transmission pad 100 is placed on the x-y plane and can be viewed through the second insulating member 44, the ferrite 20 may have a portion exposed by a predetermined width y3 outside the outline of the primary coil 10 in both directions of the y-axis. The width y3 may be 30 mm, but is not limited thereto.

The metallic shield 30 may be made of aluminum, and may have a size slightly larger than the rectangular ferrite 20. Assuming that the transmission pad 100 is placed on the x-y plane and can be viewed through the first insulating member 42, the metallic shield 30 may have a portion exposed by a predetermined width y4 outside the outline of the ferrite 20 in both directions of the y-axis. The width y4 may be 20 mm, but is not limited thereto.

The first insulating member 42 may have a size slightly larger than the second insulating member 44 having a rectangular shape. Assuming that the transmission pad 100 is placed on the x-y plane, the first insulation member 42 may have a portion exposed by a predetermined width y4 outside the outline of the second insulation member 44 in both directions of the y-axis. According to this structure, in the laminated structure of the first insulating member 42 and the second insulating member 44, a stepped portion where the horizontal length of the rectangular insulating member become different in the z-axis direction may exist.

Also, the specific dimensions of the transmission pad according to embodiments of the present disclosure may be exemplified as shown in FIG. 8. That is, the thickness of the metallic shield 30 disposed in the first insulating member 42 may be 2 mm, and the thickness between the upper portion and the lower portion of the first insulating member 42 including the metallic shield 30 may be 17 mm Here, the thickness between the top of the metallic shield 30 and the bottom of the ferrite 20 may be 10 mm.

Also, the thickness of the ferrite 20 may be 6 mm, the thickness of the first insulating member 42 may be 15 mm, the thickness of each of the first coil layer 11 and the second coil layer 12 may be 4 mm, and the thickness of the interlayer material of the second insulating member 44 disposed between the first coil layer 11 and the second coil layer 12 may be 2 mm. The second coil layer 12 may be exposed on the upper portion of the second insulating member 44.

The dimensions and spacing of the transmission pad 100 according to embodiments of the present disclosure are summarized in Table 3 below.

TABLE 3

|  | Transmission pad |
| --- | --- |
| External size | 660 * 500 mm$^2$ |
| Aluminum shield | 640 * 480 * 2 mm$^3$ |
| Aluminum underbody plate | Not applicable |
| Ferrite | 600 * 440 * 6 mm$^3$ |
| Ferrite shape | Flat plate type |
| Coil outer diameter | 540 * 380 mm$^2$ |
| Coil inner diameter | 400 * 240 mm$^2$ |
| Coil thickness | 10 mm (max.) |
| Coil width/Ferrite | 0.167/0.117 |
| Ground-Aluminum | 14 mm |
| Aluminum top - Ferrite top | 22 mm |
| Ferrite top - coil top | 15 mm |
| Aluminum top - Ferrite bottom | 16 mm (min.) |

According to the above-described configuration, the outer thickness of the laminated structure including the primary coil 10, the second insulating member 44, the ferrite 20, the first insulating member 42, and the metallic shield 30 may be about 38 mm. The vertical distance from the lower portion of the first insulating member 42 to the upper portion of the primary coil 10 or the upper portion of the second insulating member 42 is smaller than 40 mm. This may indicate that it is possible to provide a transmission pad which is considerably thinner compared to the vertical distance 53 mm or 60 mm of the comparative example.

Also, the transmission pad 100 according to embodiments of the present disclosure may have a new structure in the relationship of the X-width x1 and the Y-width y1.

That is, in the transmission pad 100 according to the present embodiment, a first value A may be obtained by adding the X-width of the primary coil and the vertical length of the central space in the x-direction and a second value B may be obtained by adding the Y-width of the primary coil and the horizontal length of the central space in the y-direction. Then, when a first ratio (B:A) and a second ratio (A:(B−A)) are obtained, the first ratio may be about 1.414, and the second ratio may be about 2.417. They have a large difference not less than 1. This may indicate that the structure of the transmission pad according to embodiments of the present disclosure is different from that of the conventional transmission pad in which A:(B−A) is designed as having a golden ratio of 1:1.618.

Further, the transmission pad 100 according to embodiments of the present disclosure has a structure different from that of the comparative example in the relationship between the coil width and the ferrite length in addition to the condition of the coil width itself. That is, in the transmission pad 100 according to the present embodiment, when the coil width and the ferrite length in the x-direction and the y-direction are respectively expressed as ratios, the first ratio in the x-direction is 0.204 (90 mm:Mm) and the second ratio in the y-direction is equal to 0.216 (130 mm:600 mm). That is, this ratio may be equally applied to the case where the outer size and the ferrite length of the transmission pad increase or decrease. As described above, the transmission pad 100 according to the present embodiment can obtain excellent coupling performance in a similar manner by changing the coil width of the primary coil according to the length of the transmission pad or ferrite.

For example, in the transmission pad 100 according to embodiments of the present disclosure, a first ratio (x1:Xf) of the X-length Xf indicating the length (vertical length) of the ferrite 20 in the x-direction and the corresponding coil width x1 in the x-direction is greater than 0.2, and a second ratio (y1:Ye of the Y-length Yf indicating the length (horizontal length) of the ferrite 20 in the y-direction and the corresponding coil width y1 in the y-direction is greater than 0.2. Also, the first ratio and the second ratio may have a difference of less than 0.02 in the range of 0.21+/−0.07.

As described above, in embodiments of the present disclosure, it is possible to provide a transmission pad in which coupling performance is maximized under a coil width condition different from that of the comparative example.

Figure 9:
FIG. 9 is an exemplary view illustrating experimental conditions for obtaining the coil width condition of the transmission pad of FIG. 5.

FIG. 9 is an exemplary view illustrating experimental conditions for obtaining the coil width condition of the transmission pad of FIG. 5.

As shown in FIG. 9, experiments were conducted to find optimum conditions for the X-width x1 (i.e., the width along x-axis) and Y-width y1 (i.e., the width along y-axis) of the primary coil, which can maximize the coupling performance for wireless power transfer, with respect to the transmission pad having the rectangular primary coil according to embodiments of the present disclosure. For this purpose, the evaluation of the coupling coefficients according to the x-axis (corresponding to the x-direction) or the y-axis (corresponding to the y-direction) separation distances was performed under 25 conditions of coil width.

The coil configuration elements adjustable to maximize coupling performance between transmission and reception coils may include coil, ferrite, and aluminum. In order to minimize loss, aluminum among such the elements was applied with a dimension 2 mm according to the specification, and a maximum thickness 6 mm of the ferrite was adopted in consideration of the maximum coupling factor.

Also, the number of turns in the coils, the diameter of the coils, and the spacing between the coils are considered in system design such as magnetic resonance and frequency control, but they do not substantially affect the coupling performance between the transmission and reception coils. Thus, the comparison evaluation was performed only for the x-axis/y-axis coil widths. In embodiments of the present disclosure, the coupling performances according to the coil widths were compared and evaluated totally 25 times for respective five conditions for the X-width and the Y-width.

Figure 10:
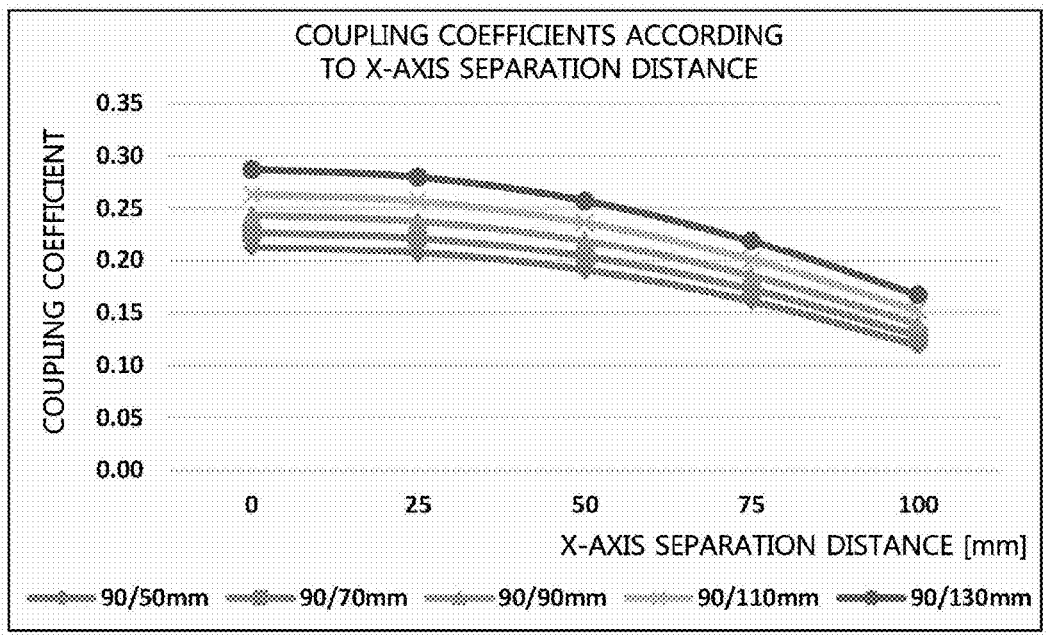
FIG. 10 is a graph showing coupling coefficients according to x-axis separation distances in the experimental conditions of FIG. 9.

FIG. 10 is a graph showing coupling coefficients according to x-axis separation distances in the experimental conditions of FIG. 9.

As shown in FIG. 10, the coupling coefficients for the x-axis separation of the reception coil (i.e., the secondary coil) shows excellent results as the y-axis coil width increases in case that the x-axis coil width of the transmission coil (i.e., the primary coil) is constant (e.g., 90 mm).

The reason is that as the y-axis width of the primary coil increases, the y-direction inner diameter of the primary coil and the y-direction inner diameter of the secondary coil are positioned substantially perpendicular to each other, which is advantageous for magnetic flux linkage. It was observed that the coupling coefficients change according to the variation of the y-axis coil width regardless of the x-axis coil width of the primary coil.

As described above, in embodiments of the present disclosure, when the y-axis width of the primary coil is changed by 20 mm from 50 mm to 130 mm, as the y-axis coil width increases, the coupling coefficient due to the generation of the separation fluctuates in a relatively large value.

Figure 11:
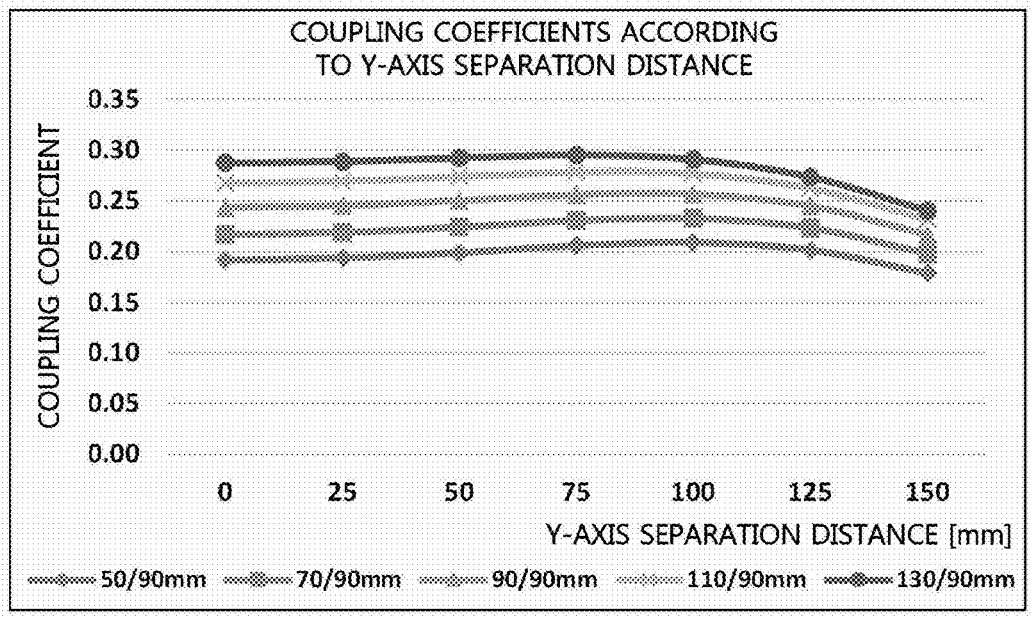
FIG. 11 is a graph showing the coupling coefficients according to y-axis separation distances in the experimental conditions of FIG. 9.

FIG. 11 is a graph showing the coupling coefficients according to y-axis separation distances in the experimental conditions of FIG. 9.

As shown in FIG. 11, the coupling coefficients for the y-axis separation of the reception coil (i.e., the secondary coil) shows excellent results as the x-axis coil width increases in case that the y-axis coil width of the transmission coil (i.e., the primary coil) is constant (e.g., 90 mm).

The reason is that as the x-axis width of the primary coil increases, the x-direction inner diameter of the primary coil and the x-direction inner diameter of the secondary coil are positioned substantially perpendicular to each other, which is advantageous for magnetic flux linkage. It was observed that the coupling coefficient changes according to the variation of the x-axis coil width regardless of the y-axis coil width of the primary coil. As described above, in embodiments of the present disclosure, when the x-axis width of the primary coil is changed by 20 mm from 50 mm to 130 mm, as the x-axis coil width increases, the coupling coefficient due to the generation of the separation fluctuates in a relatively large value.

In a case that the coil width is 30 mm, it is difficult to secure the inductance because the space for winding the coil is too small. Also, in a case that the coil width is 150 mm, the performance against the horizontal spacing is relatively too low. Thus, the two cases were excluded from the evaluation.

In addition to the examples described above, the x-axis coil width was fixed to 50 mm, 70 mm, 110 mm, or 130 mm and the y-axis coil width was changed, or the y-axis coil width was fixed to 50 mm, 70 mm, or 130 mm and the x-axis coil width was changed. As a result, it was observed that the coupling performance was the best when the x-axis coil width was 90 mm and the y-axis coil width was 130 mm.

Figure 12:
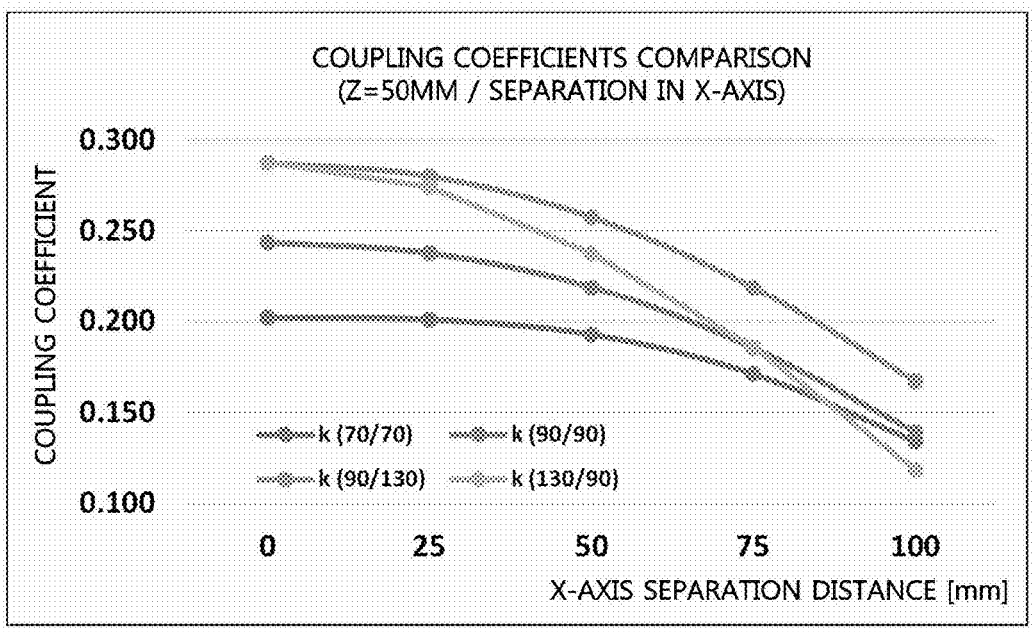
FIG. 12 is a graph illustrating x-axis separation coupling coefficient in a state where the z-axis separation distance is fixed to a first distance in the experimental conditions of FIG. 9.
Figure 13:
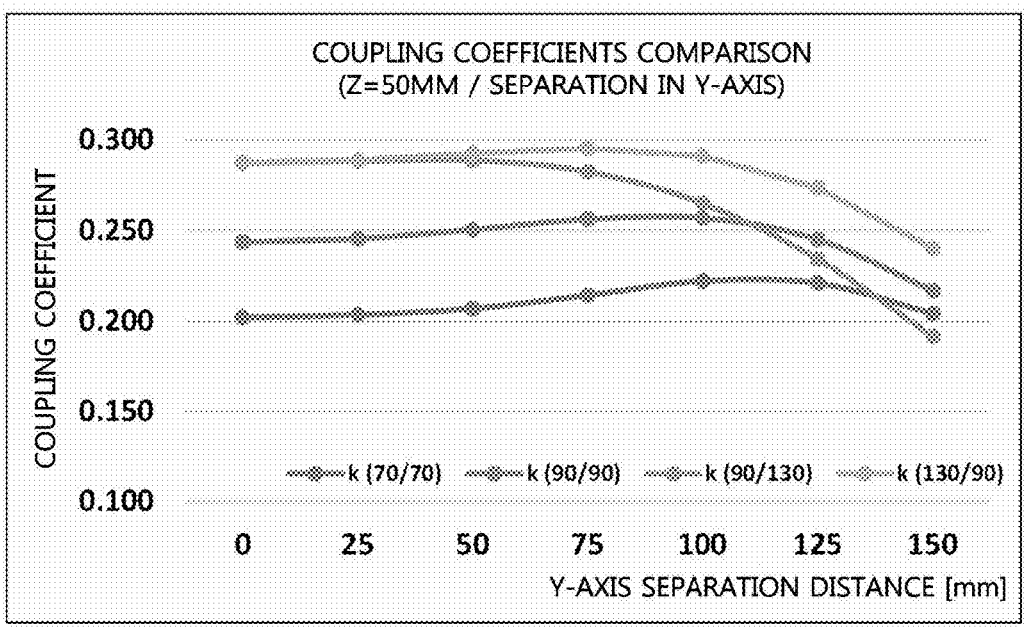
FIG. 13 is a graph illustrating y-axis separation coupling coefficients in a state where the z-axis separation distance is fixed at a first distance in the experimental conditions of FIG. 9.
Figure 14:
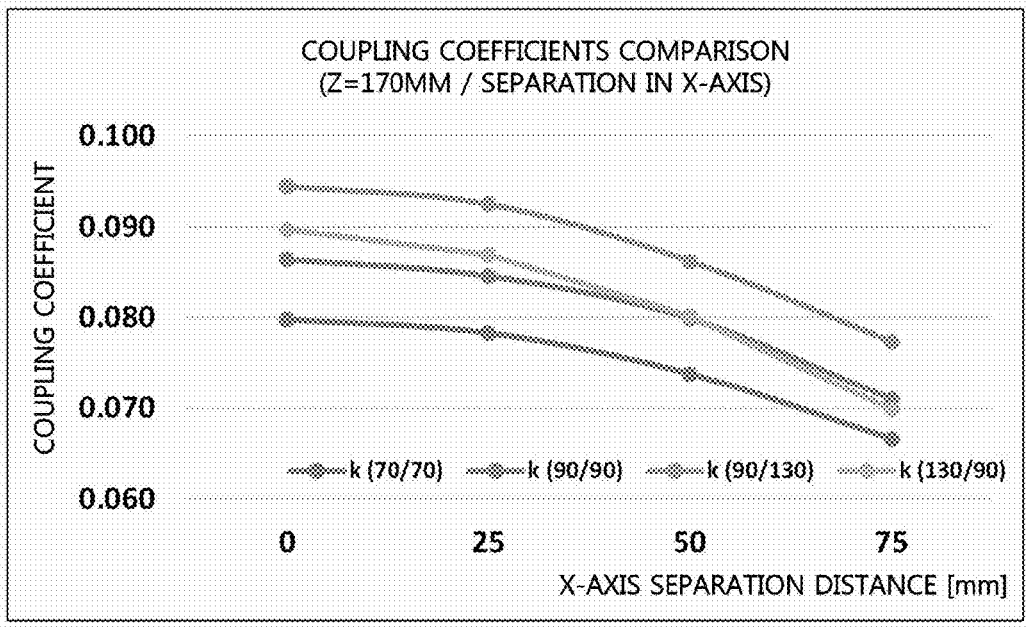
FIG. 14 is a graph illustrating x-axis separation coupling coefficients in a state where the z-axis separation distance is fixed at a second distance among the experimental conditions of FIG. 9.
Figure 15:
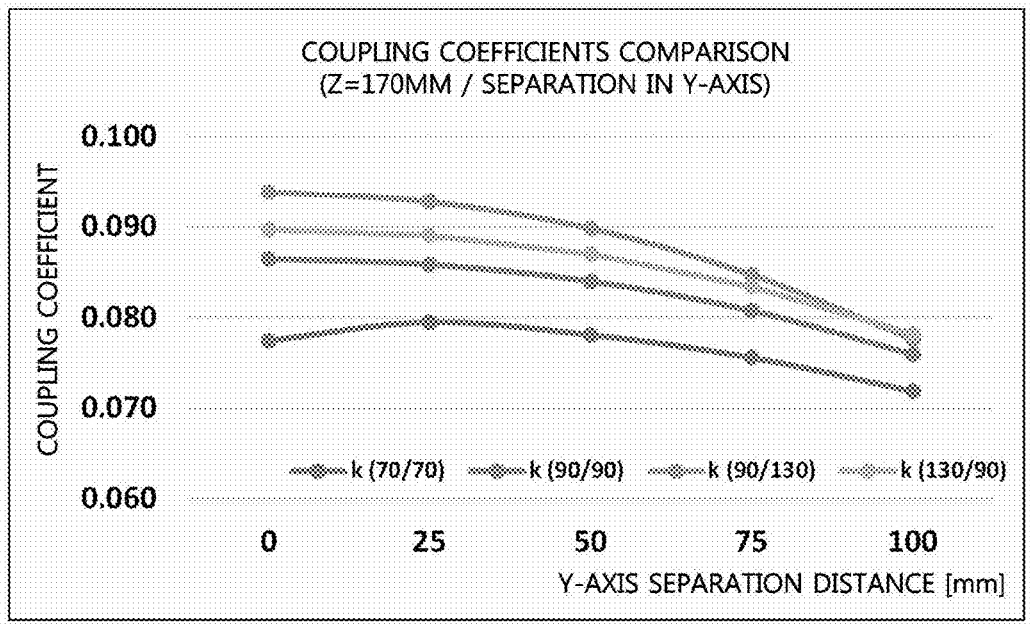
FIG. 15 is a graph illustrating y-axis separation coupling coefficients in a state where the z-axis separation distance is fixed to a second distance in the experimental conditions of FIG. 9.

FIG. 12 is a graph illustrating x-axis separation coupling coefficient in a state where the z-axis separation distance is fixed to a first distance in the experimental conditions of FIG. 9. FIG. 13 is a graph illustrating y-axis separation coupling coefficients in a state where the z-axis separation distance is fixed at a first distance in the experimental conditions of FIG. 9. FIG. 14 is a graph illustrating x-axis separation coupling coefficients in a state where the z-axis separation distance is fixed at a second distance among the experimental conditions of FIG. 9. Also, FIG. 15 is a graph illustrating y-axis separation coupling coefficients in a state where the z-axis separation distance is fixed to a second distance in the experimental conditions of FIG. 9.

Referring to FIGS. 12 to 15, when the coil width ratio of the x-axis and the y-axis is 0.204:0.217 in the present embodiment, the coupling performance is the most excellent in almost all cases, and the coupling coefficient was about 94% at the maximum separation distance of 150 mm when a y-axis separation exists under a condition that the vertical separation distance was 50 mm (e.g., refer to FIG. 13).

According to embodiments of the present disclosure, the coil width (Y-width) y1 of the primary coil corresponding to the y-direction of the rectangular transmission pad may be designed to be wider than the coil width (X-width) x1 of the primary coil corresponding to the x-direction of the rectangular transmission pad, such that it may be possible to provide a structure (i.e., transmission pad structure) capable of maximizing the coupling performance with the secondary coil in the rectangular primary coil.

According to embodiments of the present disclosure, the present invention has the following advantages compared to the conventional transmission pad.

First, in an EV wireless power transfer system, when an EV is parked, a high efficiency charging can be performed when the initial coupling coefficient is large and no separation occurs. Even when a separation exists, high efficiency can be achieved as compared with the existing structure.

Further, the variation of the coupling coefficient is not large even when the separation due to the parking occurs, which is easy in terms of application of the control technique.

Further, under a condition that the vertical separation distance between the transmission and reception coils is 50 mm and there is no separation between the central axes of the transmission coil and the reception coil, the coupling performance is superior to the conventional transmission pad condition (x/y axis coil width ratio 0.167:0.117) by about 43% and the coupling performance can be maintained at 94% even at the maximum separation distance condition (e.g., y-axis separation distance of 150 mm).

Further, under a condition that the vertical separation distance between the transmission and reception coils is 170 mm and there is no separation between the central axes of the transmission coil and the reception coil, it is possible to provide a transmission pad excellent in coupling performance by about 17% than the conventional transmission pad condition and excellent in coupling performance by about 8% even at the maximum separation distance condition (e.g., y-axis separation distance of 100 mm).

The second portion of the primary coil having the Y-width in the above-described technical configuration may have various structures or shapes. The arrangement structure of the coils in the winding of the second portion has an advantage of improving the degree of design freedom while providing excellent coupling performance depending on the shape of the transmission pad. Also, the arrangement of the coils in the winding of the second portion may be designed differently so that the shape of the magnetic field can be changed while keeping the coupling performance substantially the same in the magnetic coupling between the transmission and reception coils for wireless power transfer.

Figure 16:
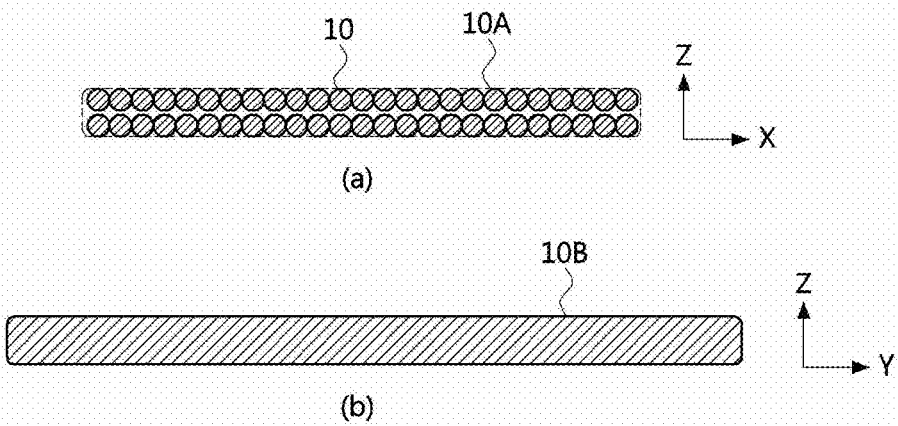
FIG. 16 is a view illustrating a portion of the primary coil in a first cross section cut by D1-D1 line and a portion of the primary coil in a second cross section cut by D2-D2 line from the transmission pad of FIG. 5.

FIG. 16 is a view illustrating a portion of the primary coil in a first cross section cut by D1-D1 line and a portion of the primary coil in a second cross section cut by D2-D2 line from the transmission pad of FIG. 5. FIG. 16 illustrates mutually orthogonal cross-sections on the same plane together with a cross-sectional placement direction indication.

Referring to (a) and (b) of FIG. 16, in the transmission pad according to embodiments of the present disclosure, the first cross-sectional area 10A for the first portion of the primary coil 10 is smaller than the second cross-sectional area 10B for the second portion of the primary coil. Here, the area of windings of the coil in the first cross-sectional area 10A and the area of windings of the coil in the second cross-sectional area 10B are substantially equal to each other. That is, the first cross-sectional area 10A may include circular cross-sectional areas for 50 windings, and the second cross-sectional area 10B may also include circular cross-sectional areas for 50 windings. The number of windings in the coil may be changed in consideration of the inductance of the wireless power transfer system.

In connection with such the configuration of embodiments of the present disclosure, assuming that there is room for the thickness or the vertical length in the z-direction, a primary coil of a general transmission pad may have various structures such as a form in which the windings of the primary coil are arranged substantially parallel to the x-y plane and a form in which the windings of the primary coil are stacked or extended in different layers. However, even in such the general primary coil structure, the cross-sectional area for the first portion of the primary coil in the x-direction and the cross-sectional area for the second portion of the primary coil in the y-direction are generally substantially equal to each other. Here, the cross-sectional area may be defined as an area of a single block obtained by connecting the outlines of the adjacent windings in the first portion or the second portion to the cross-sectional area.

As described above, in embodiments of the present disclosure, in the rectangular transmission pad having the longitudinal direction in the y-direction, the coil width (i.e., Y-width) in the y-direction of the rectangular-shaped primary coil may be designed to be larger at a constant ratio than the coil width in the x-direction (i.e., X-width) of it, such that the winding block of the first portion having the Y-width and the winding block of the second portion having the X-width can be formed, and the coupling performance for wireless power transfer through the primary coil of this structure can be maximized.

Figure 17:
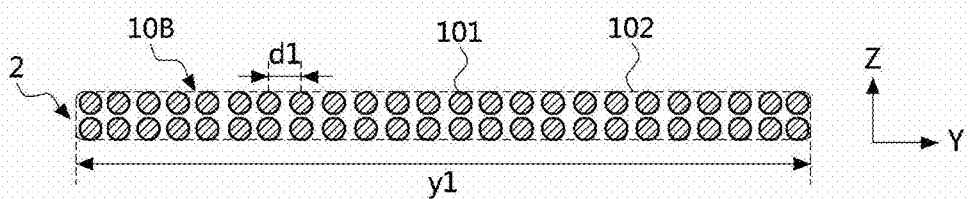
FIG. 17 is a view explaining an example of an arrangement structure of windings in the second cross section of the transmission pad in FIG. 16.

FIG. 17 is a view explaining an example of an arrangement structure of windings in the second cross section of the transmission pad in FIG. 16.

As shown in FIG. 17, the second portion of the primary coil 10 of the transmission pad according to the present embodiment may have a winding block of the second cross-sectional area 10B. The area of the windings 101 in the second cross-sectional area 10B of this winding block is equal to the area of the windings in the winding block of the first cross-sectional area described above. However, the windings 101 of the second portion according to the present embodiment may be arranged at a constant distance d1 in the y-direction to maintain the Y-width y1.

Also, insulating material 102 may be filled between the windings 101 in the second cross-sectional area 10B. In the present embodiment, the area of the insulating material 102 in the second cross-sectional area 10B may be larger than the area of the insulating material in the first cross-sectional area (e.g., see 10A in FIG. 16). This is intended to increase the coil width in the second portion by a certain percentage greater than the coil width in the first portion in order to maximize the coil coupling performance for wireless power transfer.

Meanwhile, in embodiments of the present disclosure, although the windings of the coil in the second cross sectional area were described as arranged at regular intervals in the y-direction, embodiments of the present disclosure are not limited to such a configuration. That is, the interval between adjacent windings in the y-direction may be sequentially increased or decreased. In this case, it is possible to concentrate the magnetic field on the side of the central space of the primary coil or concentrate the magnetic field on the side of the outline of the primary coil.

Figure 18:
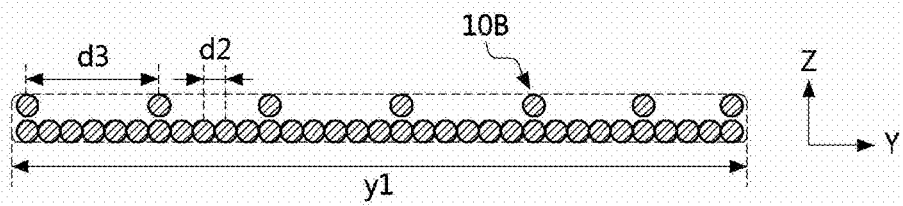
FIG. 18 is a view explaining another example of an arrangement structure of windings in the second cross section of the transmission pad in FIG. 16.

FIG. 18 is a view explaining another example of an arrangement structure of windings in the second cross section of the transmission pad in FIG. 16.

As shown in FIG. 18, the primary coil of the transmission pad according to embodiments of the present disclosure may have a multi-layered structure having windings of a first layer and windings of a second layer in the second portion. The first layer and the second layer may be laminated in the z-direction.

The distance d2 between two adjacent windings of the first layer may be smaller than the distance d1 between two adjacent windings in the second portion described above with reference to FIG. 17. If the spacing between adjacent windings is small, the intensity of the magnetic field can be increased as the gap is small.

Also, the distance d3 between two adjacent windings of the second layer may be greater than the distance d1 between two adjacent two windings of the second portion described above with reference to FIG. 17. Here, the spacing may have an average interval. If the gap between adjacent windings is large, the intensity of the magnetic field can be made small as the gap is large.

According to embodiments of the present disclosure, the primary coil may include windings of the first layer and windings of the second layer, which are arranged in the second portion as having different numbers, whereby the transmission pad having a high degree of freedom in the coil arrangement and design can be provided.

Figure 19:
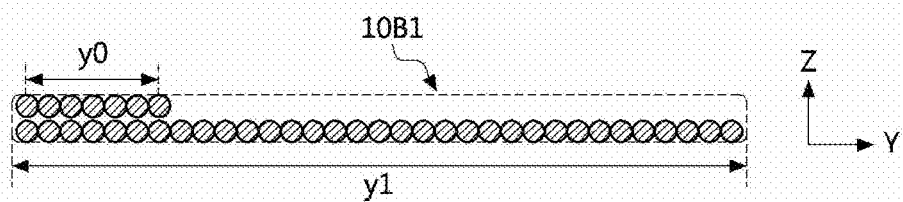
FIG. 19 is a view explaining yet another example of an arrangement structure of windings in the second cross section of the transmission pad in FIG. 16.

FIG. 19 is a view explaining yet another example of an arrangement structure of windings in the second cross section of the transmission pad in FIG. 16.

As shown in FIG. 19, the primary coil of the transmission pad according to the present embodiment may have a multilayer structure in the second portion. In this case, windings of a first layer and a second layer according to the multi-layer structure may be arranged with different numbers or spacing. However, even when the windings are arranged with different lengths (y0, y1), numbers, or intervals in respective layers in the multi-layer structure, the windings arranged in at least one layer are required to have the Y-width y1 described above.

In embodiments of the present disclosure, the second cross-sectional area 10B1 may be substantially reduced compared to the second cross-sectional area 10B described above, but if the Y-width y1 is maintained, high coupling performance can be substantially maintained. Like this, in embodiments of the present disclosure, various winding arrangement structures can be employed while having high coupling performance within a limited outer thickness or vertical length of the transmission pad.

Figure 20:
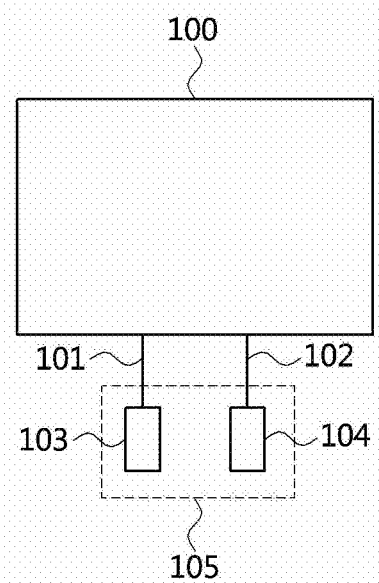
FIG. 20 is an exemplary view explaining a lead wire structure for a primary coil of a transmission pad which can be employed in embodiments according to the present disclosure.

FIG. 20 is an exemplary view explaining a lead wire structure for a primary coil of a transmission pad which can be employed in embodiments according to the present disclosure.

As shown in FIG. 20, the transmission pad 100 according to the present embodiment may include a pair of lead wires 101 and 102. The lead wires 101 and 102 may be coupled with separate terminals or connectors 103 and 104. Of course, depending on the implementation, the connectors 103 and 104 may have a structure 105 that is disposed integrally within a single housing.

The transmission pad 100 having the lead wires 101 and 102 described above may be directly connected to the power conversion circuit of the power conversion unit. Also, depending on the implementation, the transmission pad 100 may be coupled to a separate terminal block or connector unit, and may be electrically connected to the power conversion circuit coupled to the terminal block or connector unit.

On the other hand, in a wireless power transfer system, a compensation capacitor may be used in a resonance network for magnetic coupling between a primary coil and a secondary coil. In the transmission pad of embodiments of the present disclosure, the above-described compensation capacitor may be arranged in the same space as the transmission pad or may be configured using a separate board. Here, in order to arrange the compensation capacitor in the same space with the transmission pad, an arrangement structure in which the compensation capacitor is embedded inside the housing of the transmission pad or an arrangement structure in which the compensation capacitor is disposed in the outside of the housing may be applied.

The above-described transmission pad may be included in a GA of a wireless power transfer system. That is, the GA according to the present embodiment may include the power conversion unit for converting power from a grid or a power source, and the wireless power transmission pad coupled to the power conversion unit.

The wireless power transmission pad may include a rectangular primary coil having a central space, an X-width defined in the x-direction, and a Y-width defined in the y-axis direction, and a ferrite coupled to the primary coil. Here, the first cross-sectional area for the first portion of the primary coil having the X-width is smaller than the second cross-sectional area for the second portion of the primary coil having the Y-width. Also, a first area of insulating material within the first cross-sectional area may be smaller than a second area of insulating material within the second cross-sectional area.

While the embodiments of the present disclosure and their advantages have been described in detail, it should be understood that various changes, substitutions and alterations may be made herein without departing from the scope of the disclosure.

What is claimed is:

1. A wireless power transmission pad for transmitting wireless power to a reception pad including a secondary coil, the wireless power transmission pad comprising:
    a rectangular-shaped primary coil having an X-width defined in an x-direction and a Y-width defined in a y-direction and having a central space;

a ferrite coupled to the primary coil; and a housing supporting the primary coil and the ferrite, wherein a first cross-sectional area of a first portion including the X-width of the primary coil is smaller than a second cross-sectional area of a second portion including the Y-width of the primary coil, and wherein a ratio of the first cross-sectional area to the second cross-sectional area is 9:13.

2. The wireless power transmission pad according to claim 1, wherein the X-width of the primary coil is greater than 80 mm and less than 100 mm, and the Y-width of the primary coil is greater than 120 mm and less than 140 mm.

3. The wireless power transmission pad according to claim 2, wherein the X-width of the primary coil is 90 mm, and the Y-width of the primary coil is 130 mm.

4. The wireless power transmission pad according to claim 2, wherein a first ratio of the X-width of the primary coil to an X-length of the ferrite defined in the x-direction and a second ratio of the Y-width of the primary coil to a Y-length of the ferrite defined in the y-direction have a difference of less than 0.02 within a range from 0.14 to 0.28.

5. The wireless power transmission pad according to claim 2, wherein an X-width of the secondary coil defined in the x-direction is greater than 35 mm and less than 37 mm, and a Y-width of the secondary coil defined in the y-direction is greater than 35 mm and less than 37 mm.

6. The wireless power transmission pad according to claim 1, wherein the Y-width of the primary coil includes a first Y-width and a second Y-width disposed in the y-direction with the central space interposed therebetween, and respective sizes of the first Y-width and the second Y-width are different from each other.

7. The wireless power transmission pad according to claim 6, wherein a size of one of the first Y-width and the second Y-width is equal to a size of the X-width of the primary coil.

8. A wireless power transmission pad for transmitting wireless power to a reception pad including a secondary coil, the wireless power transmission pad comprising:

a rectangular-shaped primary coil having an X-width defined in an x-direction and a Y-width defined in a y-direction and having a central space;

a ferrite coupled to the primary coil; and a housing supporting the primary coil and the ferrite, wherein a first area of insulating material in a first cross-sectional area of a first portion including the X-width of the primary coil is smaller than a second area of insulating material in a second cross-sectional area of a second portion including the Y-width of the primary coil wherein windings in the second portion have a multi-layer structure, and wherein windings in the multi-layer structure are arranged at regular intervals in the y-direction, windings adjacent to each other in a first layer and windings adjacent to each other in a second layer of the multi-layer structure are arranged at different average intervals, or the windings in the multi-layer structure are arranged so that intervals between two adjacent windings in the y-direction sequentially decrease or increase.

9. The wireless power transmission pad according to claim 8, wherein an average spacing between two adjacent windings arranged in the x-direction in a cross-section of the first portion is smaller than an average spacing between two adjacent windings arranged in the y-direction in a cross-section of the second portion.

10. The wireless power transmission pad according to claim 8, wherein a ratio of the first cross-sectional area to the second cross-sectional area is 9:13.

11. The wireless power transmission pad according to claim 8, wherein the ferrite has a structure that surrounds the primary coil and protrudes into the central space of the primary coil.

12. The wireless power transmission pad according to claim 8, further comprising a metallic shield, wherein a layered structure including a first insulating member, the ferrite, a second insulating member, and the primary coil is disposed on the metallic shield.

13. The wireless power transmission pad according to claim 12, wherein an outer thickness or a vertical distance from a lower portion of the first insulating member located below the metallic shield to an upper portion of the primary coil in the layered structure is less than 40 mm.

14. A ground assembly in a wireless power transfer system, the ground assembly comprising:

a power conversion unit that converts power from a grid or a power source; and a wireless power transmission pad coupled to the power conversion unit, wherein the wireless power transmission pad includes a rectangular-shaped primary coil having an X-width defined in an x-direction and a Y-width defined in a y-direction and having a central space, and includes a ferrite coupled to the primary coil, and a first cross-sectional area of a first portion including the X-width of the primary coil is smaller than a second cross-sectional area of a second portion including the Y-width of the primary coil wherein windings in the second portion have a multi-layer structure, and wherein windings in the multi-layer structure are arranged at regular intervals in the y-direction, windings adjacent to each other in a first layer and windings adjacent to each other in a second layer of the multi-layer structure are arranged at different average intervals, or the windings in the multi-layer structure are arranged so that intervals between two adjacent windings in the y-direction sequentially decrease or increase.

15. The ground assembly according to claim 14, wherein a first area of insulating material in the first cross-sectional area is smaller than a second area of insulating material in the second cross-sectional area.

* * * * *